US008375723B2

(12) United States Patent
Benz et al.

(10) Patent No.: US 8,375,723 B2
(45) Date of Patent: Feb. 19, 2013

(54) METHOD FOR OPERATING A GAS TURBINE

(75) Inventors: Eribert Benz, Birmenstorf (CH); Peter Flohr, Turgi (CH); Adnan Eroglu, Untersiggenthal (CH); Felix Guethe, Basel (CH); Jaan Hellat, Baden-Rütihof (CH)

(73) Assignee: ALSTOM Technology Ltd., Baden (CH)

( * ) Notice: Subject to any disclaimer, the term of this patent is extended or adjusted under 35 U.S.C. 154(b) by 873 days.

(21) Appl. No.: 12/471,665

(22) Filed: May 26, 2009

(65) Prior Publication Data

US 2009/0260368 A1   Oct. 22, 2009

Related U.S. Application Data

(63) Continuation of application No. PCT/EP2007/062986, filed on Nov. 29, 2007.

(30) Foreign Application Priority Data

Dec. 1, 2006  (CH) ...................... 1956/06

(51) Int. Cl.
  *F02C 6/00* (2006.01)
  *F02C 1/00* (2006.01)
(52) U.S. Cl. .................... 60/774; 60/39.463
(58) Field of Classification Search ............. 60/39.12, 60/39.17, 39.463, 772, 774, 781
  See application file for complete search history.

(56) References Cited

U.S. PATENT DOCUMENTS

| 4,472,936 A * | 9/1984 | Uchiyama et al. ............. 60/773 |
| 4,785,622 A * | 11/1988 | Plumley et al. ............. 60/39.12 |
| RE35,061 E | 10/1995 | Correa |
| 6,817,187 B2 * | 11/2004 | Yu ................................ 60/774 |

FOREIGN PATENT DOCUMENTS

| DE | 947843 | 8/1956 |
| DE | 2503193 | 7/1976 |
| DE | 3618745 | 12/1986 |
| EP | 0622535 | 11/1994 |
| GB | 2335953 | 10/1999 |
| JP | 11-062622 | 3/1999 |
| JP | 2000-017277 | 1/2000 |
| JP | 2003-083081 | 3/2003 |
| WO | WO97/21789 | 6/1997 |
| WO | WO00/75499 | 12/2000 |
| WO | WO01/75277 | 10/2001 |
| WO | WO2008/065156 | 6/2008 |

OTHER PUBLICATIONS

Search Report for Swiss Patent App. No. CH1956/2006 (Apr. 2, 2007).
International Search Report and Written Opinion for PCT Patent App. No. PCT/EP2007/062986 (Apr. 4, 2008).

* cited by examiner

*Primary Examiner* — Ehud Gartenberg
*Assistant Examiner* — Karthik Subramanian
(74) *Attorney, Agent, or Firm* — Cermak Nakajima LLP; Adam J. Cermak

(57) ABSTRACT

In method for operating a gas turbine (11), the compressed air is fed to a combustor (18, 19) for the combustion of a coal syngas, and the resulting hot gases are expanded in a subsequent turbine (16, 17). Some of the compressed air is separated into oxygen and nitrogen, and the oxygen is used for producing the syngas. In a first combustor, (18) syngas is combusted and the resulting hot gases are expanded in a first turbine (16), and in a second combustor syngas is combusted, using the gases which issue from the first turbine (16), and the resulting hot gases are expanded in the second turbine (17). The two combustors (18, 19) are operated with undiluted syngas, and the first combustor flame temperature ($T_F$) is lowered compared with the operation with natural gas ($T_{NG}$), while the second combustor (19) is operated in the normal operation ($T_{NG}$) for natural gas.

4 Claims, 3 Drawing Sheets

METHOD FOR OPERATING A GAS TURBINE

This application is a Continuation of, and claims priority under 35 U.S.C. §120 to, International Application No. PCT/EP2007/062986, filed 29 Nov. 2007, and claims priority therethrough under 35 U.S.C. §§119, 365 to Swiss application no. 01956/06, filed 1 Dec. 2006, the entireties of both of which are incorporated by reference herein.

BACKGROUND

1. Field of Endeavor

The present invention relates to the field of power plant technology. It refers to a method for operating a (stationary) gas turbine, and also to a gas turbine useful for carrying out the method.

2. Brief Description of the Related Art

A gas turbine with reheating (reheat gas turbine) is known (see, for example, U.S. Pat. No. 5,577,378, or "State-of-the-art gas turbines—a brief update", ABB review 02/1997, FIG. 15, turbine type GT26), which combines a flexible operation with very low exhaust gas emission values.

The machine architecture of gas turbine of type GT26 is uniquely and suitably characterized for the realization of a concept which is the subject of the present invention, because:
- in the compressor there is already a significant tapping off of compressor air at medium compressor pressures,
- sequential combustion enables a high stability of combustion in the case of reduced values of oxygen surplus, and
- a secondary air system is available which enables air to be tapped off from the compressor and cooled down, and the cooled-down air to be used for cooling the combustor and the turbine.

The principle of the known gas turbine with reheating is reproduced in FIG. 1. The gas turbine 11, which is part of a combined-cycle power plant 10, includes two compressors, specifically a low-pressure compressor 13 and a high-pressure compressor 14, which are connected in series and arranged on a common shaft 15, and also two combustors, specifically a high-pressure combustor 18 and a reheat combustor 19, and associated turbines, specifically a high-pressure turbine 16 and a low-pressure turbine 17. The shaft 15 drives a generator 12.

The principle of operation of the plant is the following: air is inducted via an air intake 20 by the low-pressure compressor 13 and first compressed to an intermediate pressure level (about 20 bar). The high-pressure compressor 14 then further compresses the air to a high pressure level (about 32 bar). Cooling air is tapped off both at the intermediate pressure level and at the high pressure level and cooled in associated OTC coolers (OTC=Once-Through Cooler) 23 and 24, and via cooling air lines 25 and 26 is transmitted to the combustors 18, 19 and turbines 16, 17 for cooling. The remaining air from the high-pressure compressor 14 is guided to the high-pressure combustor 18 and heated there by combustion of a fuel which is fed via the fuel feed line 21. The resulting exhaust gas is then expanded in the subsequent high-pressure turbine 16 to a medium pressure level, performing work. After expansion, the exhaust gas is reheated in the reheat combustor 19 by combustion of a fuel which is fed via the fuel feed line 22, before it is expanded in the subsequent low-pressure turbine 17, performing further work.

The cooling air which flows through the cooling air lines 25, 26 is injected at suitable points of the combustors 18, 19 and turbines 16, 17 in order to limit the material temperatures to an acceptable degree. The exhaust gas which issues from the low-pressure turbine 17 is sent through a heat recovery steam generator 27 (HRSG=Heat Recovery Steam Generator) in order to produce steam which, within a water-steam cycle, flows through a steam turbine 29 and performs further work there. After the heat recovery steam generator 27 has been subjected to throughflow by the exhaust gas, the exhaust gas is finally discharged to the outside through an exhaust gas line 28. The OTC coolers 23, 24 are part of the water-steam cycle; superheated steam is produced at their outlets.

A high flexibility in operation is achieved as a result of the two consecutive combustions, which are independent of each other, in the combustors 18 and 19; the combustor temperatures can be set so that the maximum efficiency is achieved within the existing limits. The low exhaust gas values of the sequential combustion system are produced as a result of the inherently low emission values which can be achieved in the case of reheating (under certain conditions the second combustion even leads to a consumption of NOx).

On the other hand, combined-cycle power plants with single-stage combustion in the gas turbines are known (see, for example, U.S. Pat. No. 4,785,622 or U.S. Pat. No. 6,513,317), in which is integrated a coal gasification plant which is supplied with oxygen from an air separation unit (ASU) in order to provide the fuel, in the form of syngas which is produced from coal, which is required for the gas turbine. Such combined-cycle power plants are referred to as IGCC plants (IGCC=Integrated Gasification Combined Cycle).

The present invention is now based on the knowledge that, by the use of gas turbines with reheating according to FIG. 1 in an IGCC plant, the advantages of this gas turbine type can be utilized for the plant in a special way.

The highest flexibility and efficiency during the operation of an IGCC plant can be achieved if the air separation unit is not integrated and if undiluted fuels can be combusted. Using a gas turbine with reheating according to FIG. 1, this can be realized, while at the same time the emissions can be minimized on account of an alternative concept of the NOx controls. This type of process profits from the advantages of reheating.

The integration of a gas turbine in an IGCC plant typically influences both the compressor and the combustors, as is clear in FIG. 2. The combined-cycle power plant 30 of FIG. 2 includes a gas turbine 11 with a low-pressure compressor 13, a subsequent high-pressure compressor 14, a high-pressure combustor 18 with a subsequent high-pressure turbine 16, and a reheat combustor 19 with a subsequent low-pressure turbine 17. The compressors 13, 14 and the turbines 16, 17 are seated on a common shaft 15, by which a generator 12 is driven. The combustors 18 and 19 are supplied via a syngas feed line 31 with syngas as fuel which is produced by gasification of coal (coal feed line 33) in a coal gasification plant 34. A cooling device 35 for the syngas, a cleaning plant 36, and a $CO_2$ separator 37 with a $CO_2$ outlet 38 for discharge of the separated $CO_2$, are connected downstream to the coal gasification plant 34.

For coal gasification in the coal gasification plant 34, oxygen ($O_2$) is used, which is produced in an air separation unit 32 and fed via an oxygen line 32a. The air separation unit 32 obtains compressed air from the outlet of the low-pressure compressor 13. The nitrogen ($N_2$) which also results during the separation is fed for example via a nitrogen line 32b to the low-pressure combustor 19 (and/or to the high-pressure combustor 18) for diluting the syngas.

For cooling the components of the combustors 18, 19 and turbines 16, 17, which are stressed by the hot gas, compressed cooling air is tapped off at the outlets of the two compressors 13 and 14, cooled in a downstream OTC cooler 23 or 24, and then via corresponding cooling lines 25 and 26 fed to places which are to be cooled.

At the outlet of the low-pressure turbine 17, a heat recovery steam generator 27 is arranged, which together with an associated steam turbine 29 is part of a water-steam cycle. The exhaust gas which issues from the heat recovery steam generator 27 is discharged to the outside via an exhaust gas line 28.

Such an integration of the gas turbine leads to
air being tapped from the compressor for the air separation unit in order to compensate for the fuel mass flow which is fed via the combustors; and
nitrogen ($N_2$) being added for diluting the syngas fuels (CO-rich and $H_2$-rich fuels) in order to control the production of NOx.

When using syngas fuels, there are basically two possibilities for controlling the NOx:
It is general practice to control the NOx level in the case of CO-rich and subsequent $H_2$-rich syngas fuels by the fuel being diluted with $N_2$ from the air separation unit after the gasification (see FIG. 2).
An alternative to $N_2$ dilution is the reduction of the flame temperature or, in the case of an afterburner or reheating, the reduction of the inlet temperature in the second stage of combustion.

This possible alternative for a gas turbine with reheating offers the opportunity of controlling the production of NOx without noticeably forfeiting output.

SUMMARY

One of numerous aspects of the present invention includes a method for operating a gas turbine which operates together with a coal gasification plant and which can be characterized by a reduction of NOx emissions without noticeable loss of output and flexibility of operation.

Another aspect include a gas turbine with reheating which comprises two combustors and two turbines, wherein in the first combustor syngas is combusted, using the compressed air, and the resulting hot gases are expanded in the first turbine, and wherein in the second combustor syngas is combusted, using the gases which issue from the first turbine, and the resulting hot gases are expanded in the second turbine, the two combustors are operated with undiluted syngas, and the flame temperature in the first combustor of the gas turbine is lowered compared with the operation with natural gas, while the second combustor is operated in the normal mode which is designed for natural gas.

One aspect of the method includes that CO-rich syngas is used as fuel, and in that the flame temperature in the first combustor of the gas turbine is lowered by 50-100 K compared with the operation with natural gas.

Another aspect of the method includes that $H_2$-rich syngas is used as fuel, and the flame temperature in the first combustor of the gas turbine is lowered by 100-150 K compared with the operation with natural gas.

BRIEF DESCRIPTION OF THE DRAWINGS

The invention is to be subsequently explained in more detail based on exemplary embodiments in conjunction with the drawings. In the drawings.

DETAILED DESCRIPTION OF EXEMPLARY EMBODIMENTS

Figure 1:
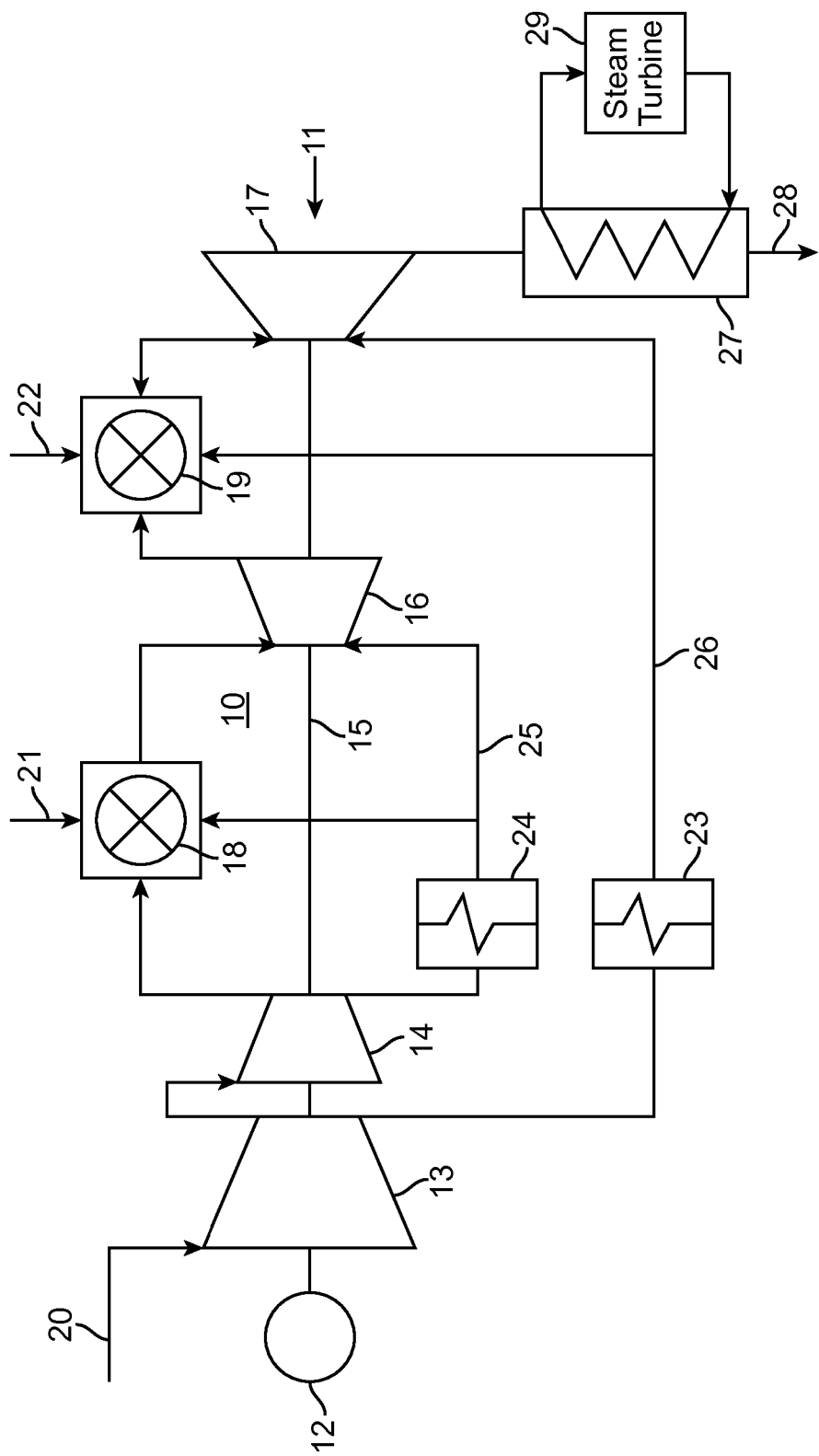
FIG. 1 shows the simplified schematic diagram of a combined-cycle power plant with a gas turbine with reheating or sequential combustion according to the prior art.
Figure 2:
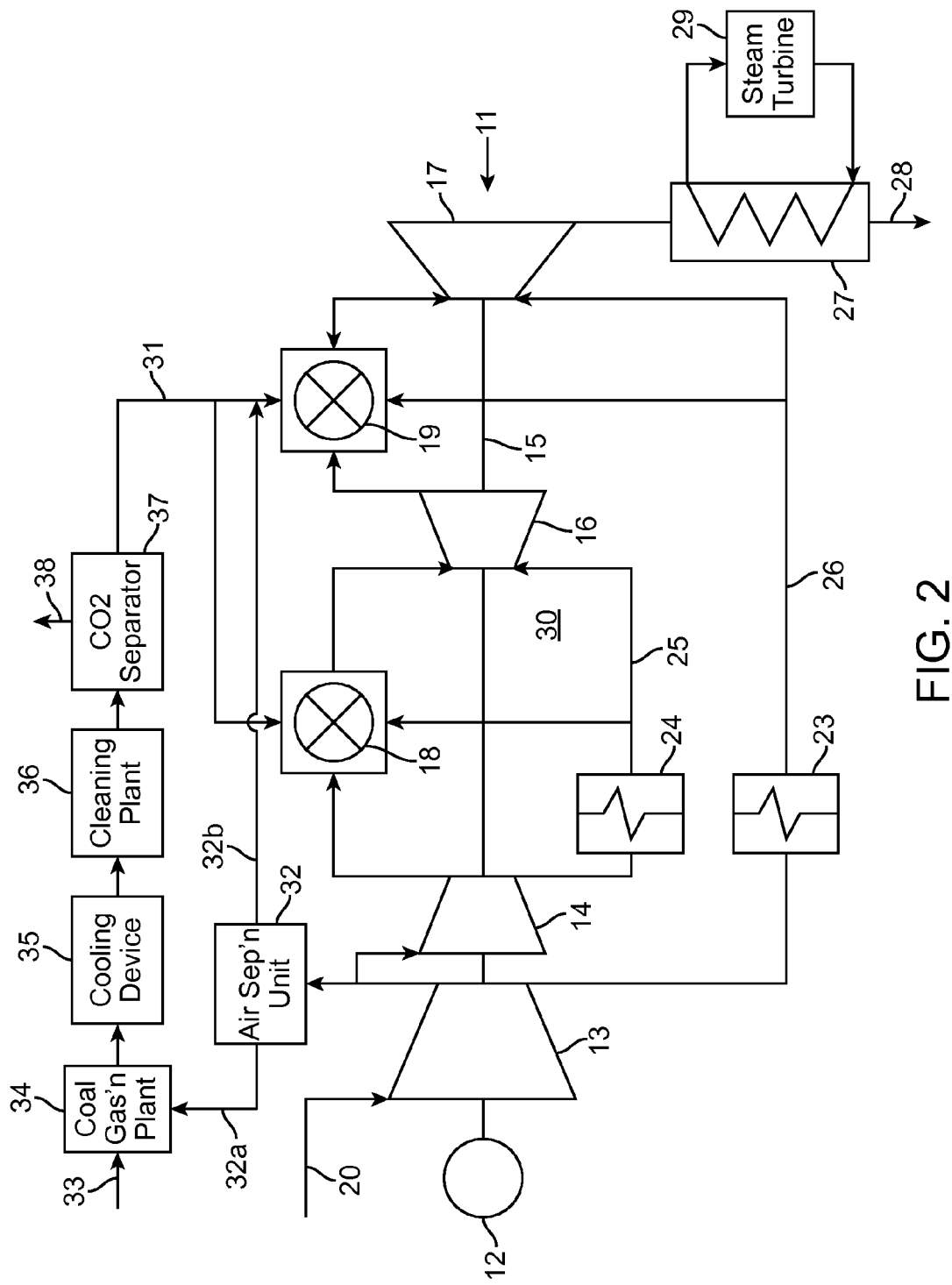
FIG. 2 shows the simplified schematic diagram of an IGCC plant with a gas turbine with reheating or sequential combustion, wherein the nitrogen which is produced during air separation is used for diluting the syngas.
Figure 3:
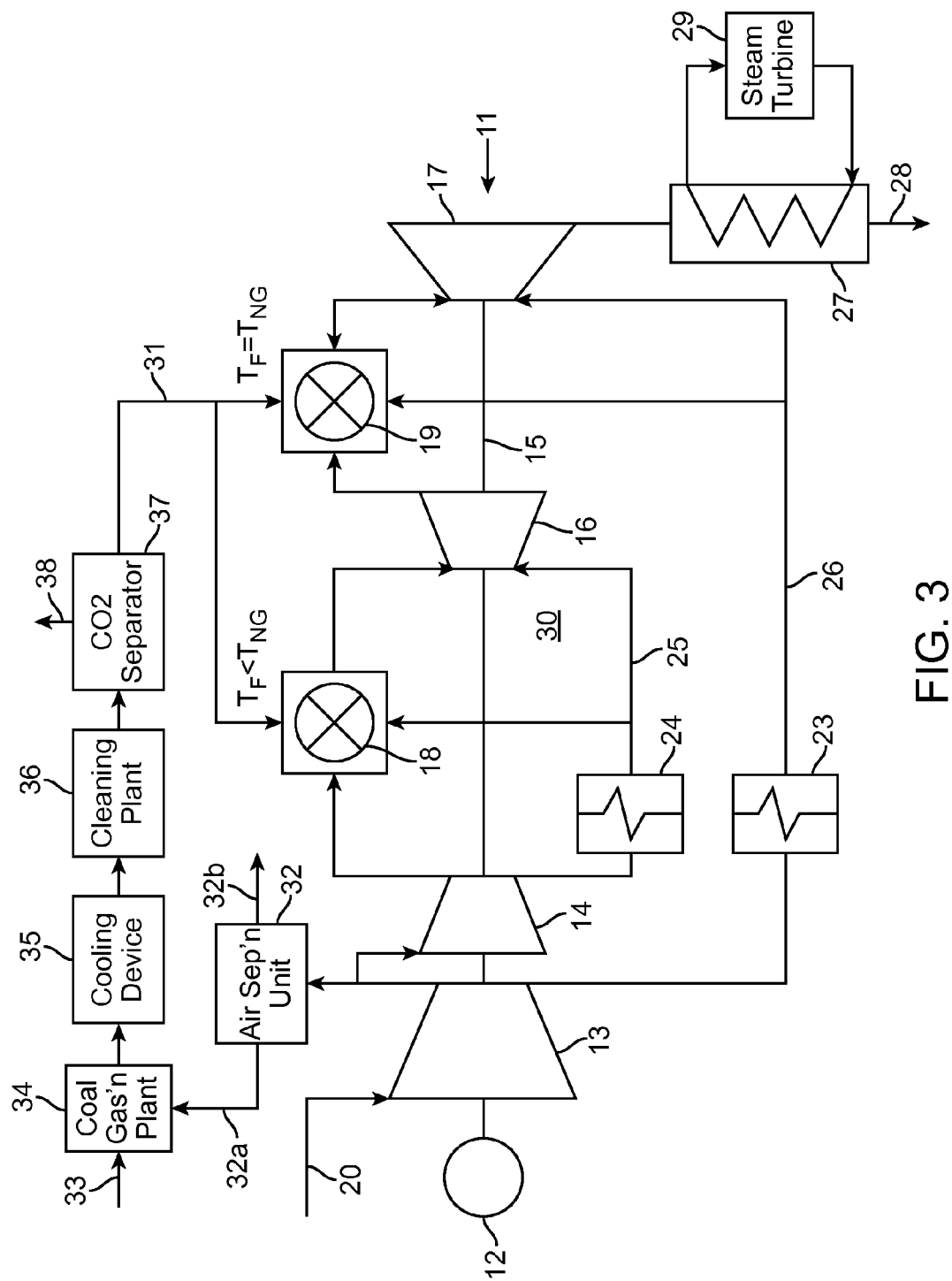
FIG. 3 shows the simplified schematic diagram of an IGCC plant with a gas turbine with reheating or sequential combustion, wherein according to an exemplary embodiment of the invention, undiluted syngas is used as fuel and the flame temperature in the first combustor is reduced for reducing the NOx emission.

In FIG. 3, an IGCC plant with a gas turbine with reheating or sequential combustion, which is operated according to principles the invention, is shown in a much simplified schematic diagram. For like plant components, the same designations are used in this case, as in FIG. 2. The nitrogen ($N_2$) which accumulates in the air separation unit 32 is no longer used here for dilution of the syngas which is used as fuel, but the syngas is injected into the combustors 18, 19 in an undiluted state. For this, in the first combustor 18 the flame temperature $T_F$ is lowered compared with the temperature $T_{NG}$ which prevails during normal natural gas operation, whereas in the second combustor 19 the nominal flame temperature $T_{NG}$ which is provided for natural gas operation is maintained. As a result of lowering the flame temperature in the first combustor 18, the production of NOx can be controlled without a crucial loss of output occurring. Thus, in the case of a gas turbine without reheating or sequential combustion, a reduction of output by 10% and a reduction of efficiency by 1% results by lowering the flame temperature in the (single) combustor by 100° C., whereas lowering the flame temperature in the first combustor of a gas turbine with sequential combustion brings about a reduction of output by only about 1% and a reduction of efficiency by only 0.1%.

The extent of lowering the flame temperature $T_F$ in the first combustor 18 in this case depends upon the type of syngas which is used:

In the case of an IGCC plant with CO-rich syngas, the following situation ensues:
The flame temperature $T_F$ in the first combustor 18 is lowered by 50-100 K compared with the natural gas operation.
The second combustor 19 is operated with the nominal flame temperature, but with a lower inlet temperature which results on account of the reduced flame temperature in the first combustor.
Consequently, an operation of the two combustors 18, 19 without dilution of the syngas with nitrogen is possible; the low heating value (LHV) of the undiluted syngas lies within the order of magnitude of 12-14 (MJ/kg); diluted syngas fuels have low heating values in the order of magnitude of 5-7 (MJ/kg).
On account of the fact that only the first combustor 18 is operated with reduced flame temperature or reduced turbine inlet temperature, the second combustor operates in an unaltered state with the flame temperature which is provided for natural gas operation so that the turbine exhaust temperature (of the second turbine 17) is the same as in the case of natural gas operation. Therefore, no loss of output and efficiency results for the combined-cycle process of the IGCC plant. This is a special characteristic of the gas turbine with reheating, in which the flame is controlled by the inlet conditions instead of by the exhaust conditions.

In a gas turbine without reheating, however, a reduced flame temperature or turbine inlet temperature results in a significant reduction of the turbine exhaust temperature. This causes an appreciable loss of output and efficiency for the combined-cycle process of the IGCC plant in comparison with the natural gas operation.

The plant can therefore be operated with the following advantages:

The highest possible flexibility and the highest possible efficiency result during the operation of the IGCC plant; the air separation unit 32 does not have to be integrated and the fuel does not have to be diluted with nitrogen.

A small reduction of the flame temperature is achieved during the combustion of the undiluted CO-rich fuel in order to control the production of NOx.

No change is necessary in the mechanical layout of compressor and turbine of the gas turbine which is designed for natural gas. The absent syngas dilution leads to a smaller difference in the heating value between natural gas and undiluted syngas in comparison to diluted syngas.

The operating concept for the gas turbine is simple and flexible.

The operation of the entire plant is flexible on account of the absent integration of the air separation unit 32.

The unaltered exhaust temperature of the gas turbine leads to high output and high efficiency for the IGCC plant.

In the case of an IGCC plant with $H_2$-rich syngas with a $CO_2$ displacement reaction for the $CO_2$ separation, the following situation ensues:

The flame temperature $T_F$ in the first combustor 18 during operation with $H_2$ is lowered by 100-150 K compared with the natural gas operation.

The second combustor 19 is operated with the nominal flame temperature for natural gas operation.

Consequently, an operation of the two combustors 18, 19 without dilution of the syngas with nitrogen is possible; the low heating value of $H_2$ lies in the order of magnitude of 30-35 (MJ/kg); the low heating value of the supplementary fuel and of undiluted $H_2$ is in the same order of magnitude, which leads to a less serious mismatch of turbine and compressor.

Diluted $H_2$-fuels have a low heating value in the order of magnitude of 6-9 (MJ/kg).

On account of the fact that only the first combustor 18 is operated with reduced flame temperature or turbine inlet temperature, the turbine exhaust temperature of the gas turbine is the same as in the case of natural gas operation. Therefore, no loss of output and efficiency for the combined-cycle process of the IGCC plant results.

In a gas turbine without reheating, however, a reduced flame temperature or turbine inlet temperature results in a significant reduction of the turbine exhaust temperature. This causes an appreciable loss of output and efficiency for the combined-cycle process of the IGCC plant in comparison to the natural gas operation.

The plant can therefore be operated with the following advantages:

The highest possible flexibility and the highest possible efficiency result during the operation of the IGCC plant; the air separation unit 32 does not have to be integrated and the fuel does not have to be diluted with nitrogen.

The costs for installation and also for operation and maintenance of the plant are reduced. No equipment for compression of $N_2$ is necessary.

A small reduction of the flame temperature is achieved during the combustion of the undiluted $H_2$-fuel in order to control the production of NOx.

No change is necessary in the mechanical layout of compressor and turbine of the gas turbine which is designed for natural gas. The absent syngas dilution leads to a smaller difference in the heating value between natural gas and undiluted syngas in comparison to diluted syngas.

The operating concept for the gas turbine is simple and flexible.

The operation of the entire plant is flexible on account of the absent integration of the air separation unit 32.

The unaltered exhaust temperature of the gas turbine leads to high output and high efficiency for the IGCC plant.

On account of the absent integration of the air separation unit the operation of the plant is flexible and can be started quicker.

The precondition for the concept of the not fully integrated air separation unit, which is described above, is that undiluted coal gas can be used in the two combustors of the gas turbine.

The main technical challenges for the combustion of such undiluted coal gas in the combustors of the gas turbine are:

the achievement of low emission values, sufficient distances to the limits for flashbacks and pulsations, maintaining operating flexibility during fluctuations in the quality of the coal gas, and the possibility of the use of supplementary fuel (natural gas or oil), the tapping and returning of cooling air in the hot gas regions of combustor and turbine.

The gas turbine with reheating meets these challenges particularly well in the case of syngas applications for the following reasons:

1. An advantage in the case of NOx emission, which via the optimum choice of the combustion temperatures in the two combustors can be transferred to syngas applications, is specific to the gas turbine with reheating.

2. The combustion stability and the operational flexibility of the gas turbine with reheating are greater than in the case of a comparable machine with single-stage combustion. Operating limits, at a given flame temperature, are typically provided by flame extinction and flashback and/or emission levels, which leads to a permissible range of fuel qualities and fuel reactivities. In the case of a turbine with reheating, these operating limits are appreciably broadened because the two combustion systems enable the operation with two different or independent flame temperatures, i.e., a lower temperature in the first stage and a higher temperature in the second stage, with only slight disadvantages with regard to NOx emission.

3. The requirements for the gas pressure can be minimized if no diluted $N_2$ is injected into the first and second combustion system, which typically operates at a pressure of >30 bar or in the range of 15-20 bar.

LIST OF DESIGNATIONS

10, 30 Combined-cycle power plant
11 Gas turbine
12 Generator
13 Low-pressure compressor
14 High-pressure compressor
15 Shaft (gas turbine)

16 High-pressure turbine
17 Low-pressure turbine
18 Combustor (high-pressure combustor)
19 Combustor (reheat combustor)
20 Air intake
21, 22 Fuel feed line
23, 24 OTC cooler
25, 26 Cooling line
27 Heat recovery steam generator
28 Exhaust gas line
29 Steam turbine (steam cycle)
31 Syngas feed line
32 Air separation unit
32$a$ Oxygen line
32$b$ Nitrogen line
33 Coal feed line
34 Coal gasification plant
35 Cooling device
36 Cleaning plant
37 $CO_2$ separator
38 $CO_2$ outlet While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operating a gas turbine, in which method air is inducted and compressed by the gas turbine, the compressed air is fed to a combustor for combustion of a syngas which is produced from coal, and the hot gases resulting from combustion are expanded in a subsequent turbine, performing work, wherein some of the compressed air is separated into oxygen and nitrogen, and the oxygen is used in a coal gasification plant for producing the syngas, the method comprising:

providing a reheating gas turbine which comprises first and second combustors and first and second turbines, respectively, wherein said first combustor has a first rated flame temperature for the combustion of natural gas and said second combustor has a second rated flame temperature for the combustion of natural gas;

providing an undiluted syngas produced from coal;

combusting said undiluted syngas in the first combustor with the compressed air to produce first hot gases;

expanding said first hot gases in the first turbine;

combusting undiluted syngas in the second combustor with gases which issue from the first turbine, to produce second hot gases;

expanding said second hot gases in the second turbine;

maintaining the flame temperature in said first combustor 50-150 K below said first rated flame temperature, and maintaining the flame temperature in said second combustor at said second rated temperature.

2. The method as claimed in claim 1, wherein said undiluted syngas comprises CO-rich syngas, and wherein maintaining the flame temperature in said first combustor comprises maintaining 50-100 K below said first rated flame temperature.

3. The method as claimed in claim 1, wherein said undiluted syngas comprises $H_2$-rich syngas, and wherein maintaining the flame temperature in said first combustor comprises maintaining 100-150 K below said first rated flame temperature.

4. The method as claimed in claim 1, wherein said gas turbine is in a combined-cycle power plant.

* * * * *